Aug. 5, 1941.    C. F. RAUEN    2,251,342
SYNCHRONIZING FREE WHEEL TRANSMISSION
Filed June 13, 1932    5 Sheets-Sheet 1
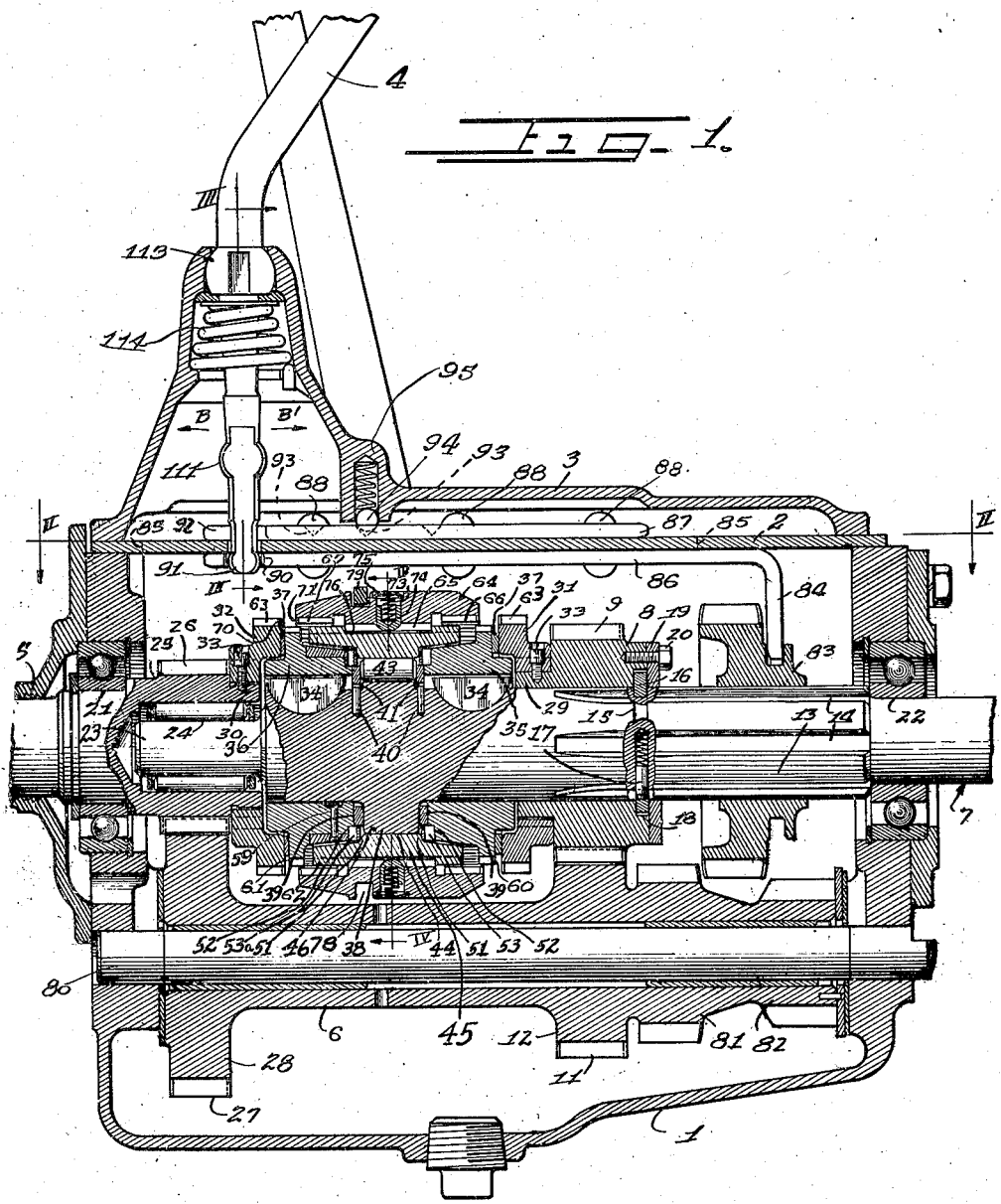
INVENTOR.
Carl F. Rauen.
BY
Charles O'Neill
ATTORNEY.

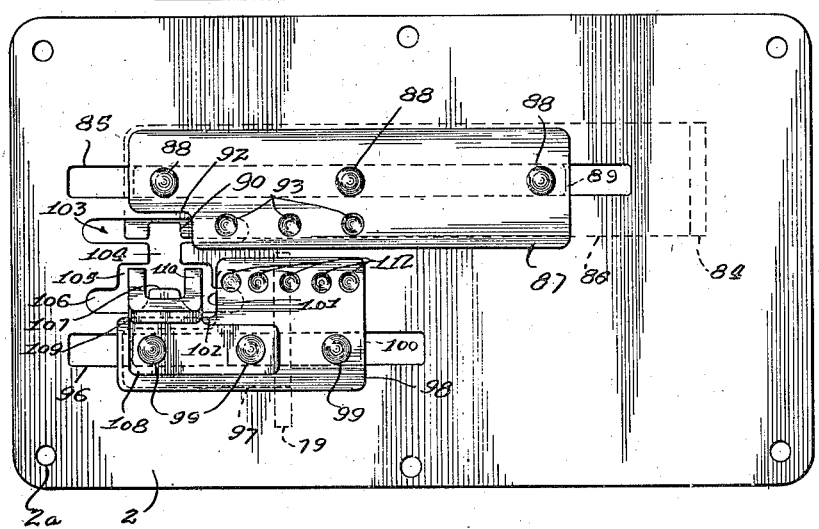

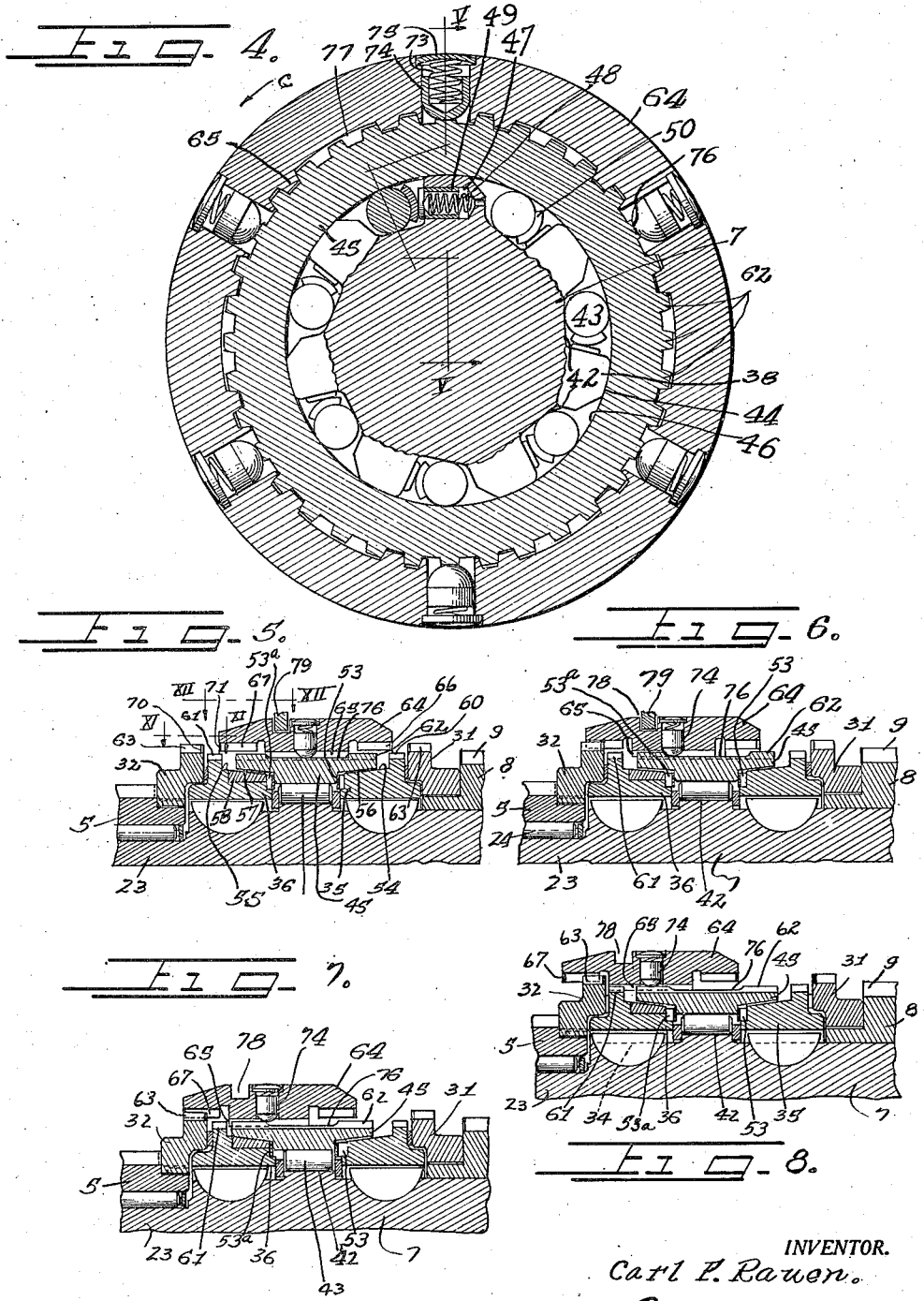

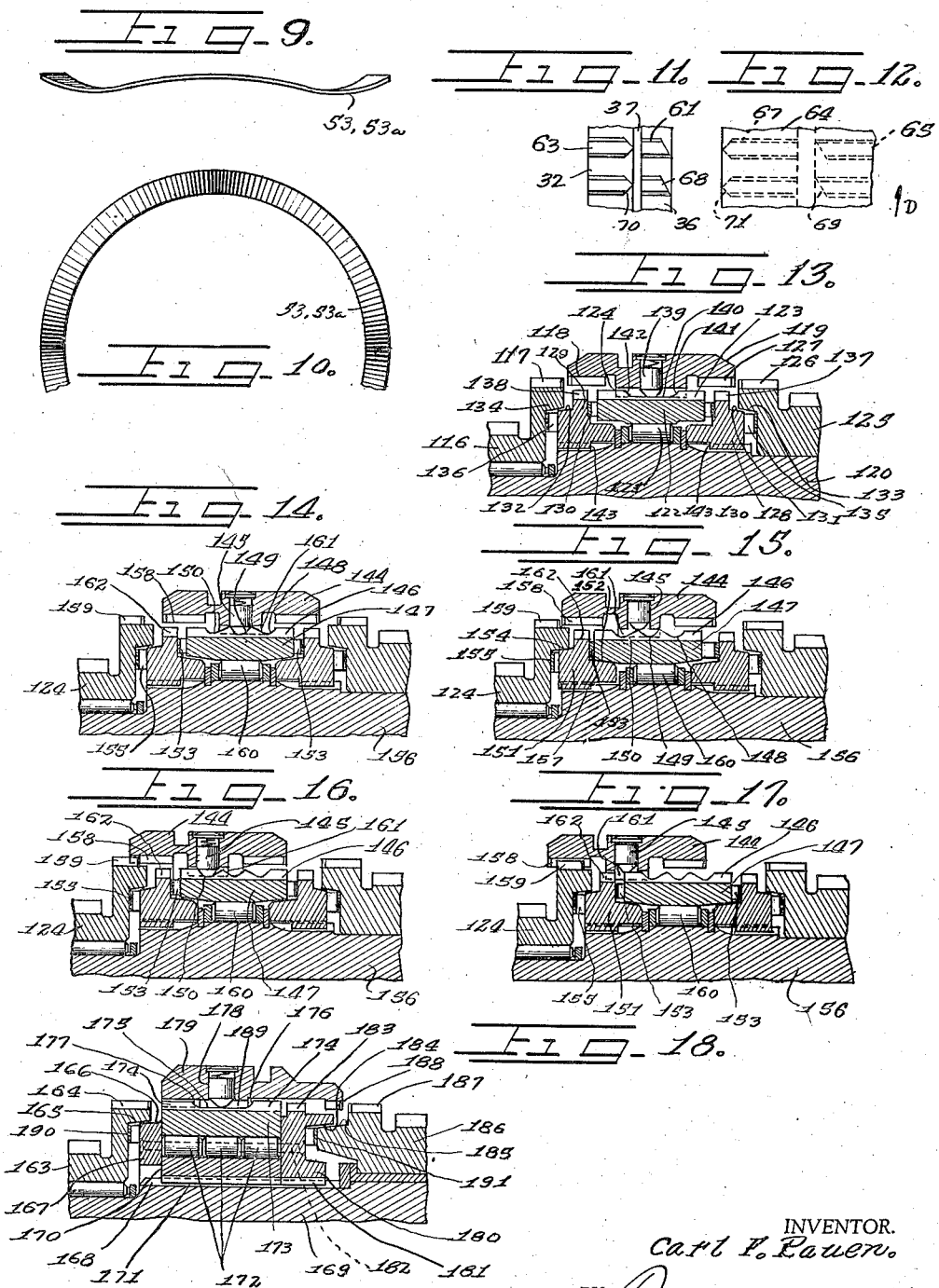

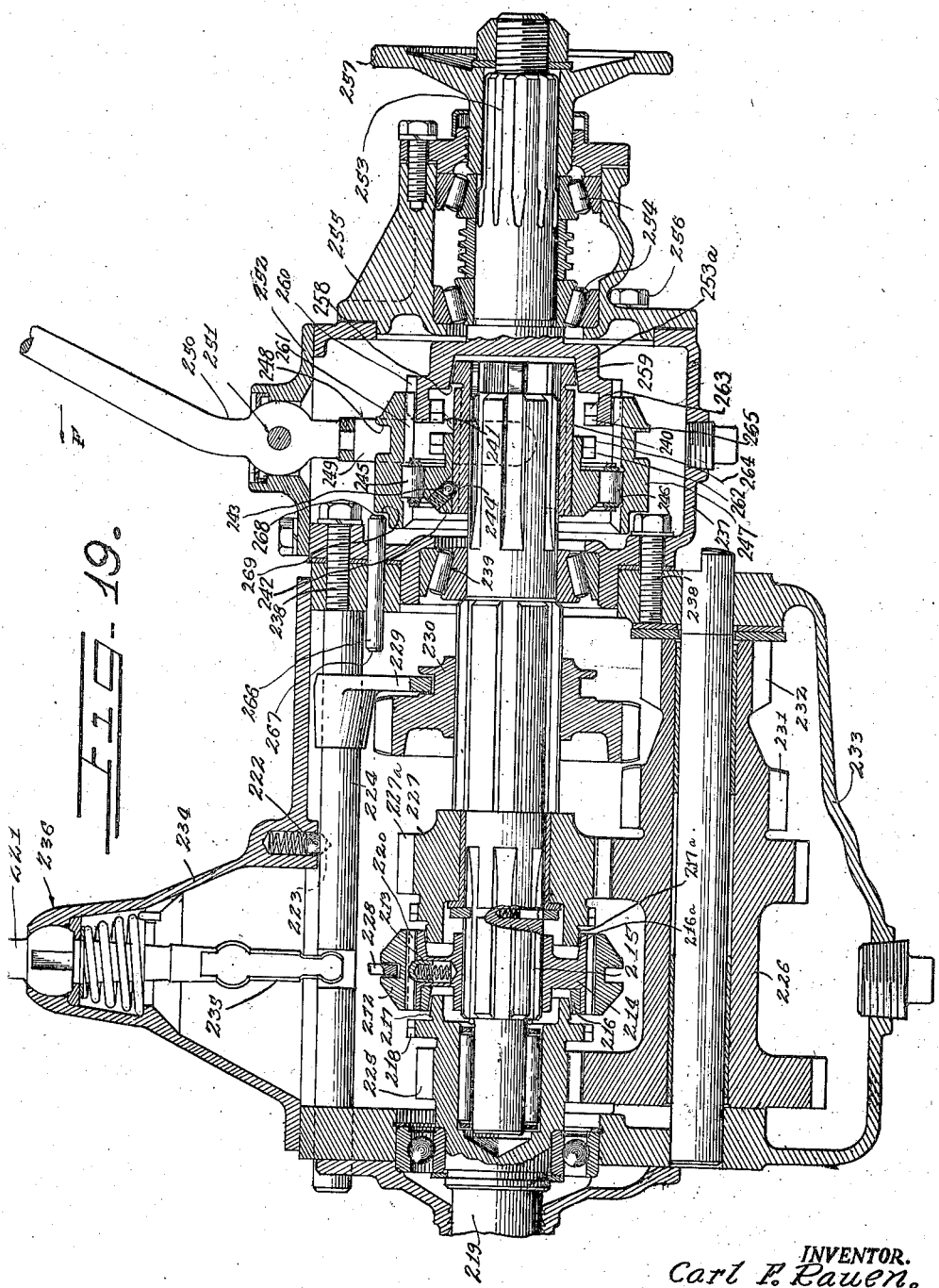

Patented Aug. 5, 1941

2,251,342

UNITED STATES PATENT OFFICE 2,251,342

SYNCHRONIZING FREE WHEEL TRANSMISSION

Carl F. Rauen, Grosse Pointe, Mich., assignor, by direct and mesne assignments, to Borg-Warner Corporation, Chicago, Ill., a corporation of Illinois Application June 13, 1932, Serial No. 616,829

16 Claims. (Cl. 192—48)

This invention relates to mechanism for synchronizing the rotary members providing a free wheeling drive associated with the power transmission system of an automobile or the like.

The term "free wheeling" is descriptive of that condition of operating an automobile or the like, whereby the driving mechanism will automatically permit "wheeling" or running of the automobile "free" of driving the engine, at a speed correspondingly equal to or greater than the engine speed.

The term "synchronizing the rotary members providing a free wheeling drive" is descriptive of that condition of operation of the free wheeling mechanism prior to establishing a condition of driving through it, whereby the rotatable members of the free wheeling mechanism are first frictionally engaged until they rotate as a unit, i. e., are synchronized, and are then coupled together.

Synchronizing prior to coupling the rotatable members is highly meritorious since it makes possible an unhesitatingly quick, silent and easy coupling of the members without harm to the mechanism thereof.

This invention therefore has for its objects to provide in a device of this character; means whereby speed changes can be made quickly, easily, silently, unhesitatingly and harmlessly to the mechanism thereof; manual control means whereby the effort required to perform said speed changes is reduced to a minimum and easily carried out; means whereby the change speed control lever is prevented from producing annoying sounds when at rest while the vehicle is in motion; means whereby rotatable members adapted to be coupled and held together in unvarying angular relation with each other are frictionally synchronized in angular velocity, prior to coupling them together; means whereby the frictional effort of synchronizing is lessened, prior to coupling together the synchronized members; means whereby the synchronizing member clutches the members synchronized and holds the same in unvarying angular relation; means whereby the clutching means of synchronized members provide self-alignment during the coupling of the same; means whereby positive frictional dis-engagement takes place before said members are coupled in unvarying angular relation; means whereby a limited manual effort for actuating the synchronizing means produces a differential amplitude of the frictional effort for synchronizing members providing change speed changes; means for transmitting power to the driving axle, said means not transmitting power from said driving axle; and manually controlled means whereby the means for transmitting power to the driving axle provides transmission of power from said driving axle.

This invention will be best understood by reference to the following description of the several embodiments thereof, shown in the accompanyings, wherein:

Figure 1 is a sectional view of the transmission mechanism in neutral, along the substantially vertical center thereof;

Figure 2 is a plan view of part of the control mechanism, along the line II—II of Figure 1;

Figure 3 is a sectional view of the control mechanism along the line III—III of Figure 1;

Figure 4 is a sectional view of part of Figure 1, along the line IV—IV;

Figure 5 is a half sectional view of Figure 4, along the line V—V;

Figures 6, 7 and 8 are views of different arrangements of Figure 5;

Figures 9 and 10 are views of a detail of the invention;

Figures 11 and 12 are part views of clutch tooth details of this invention;

Figure 13 is a half sectional view of a modification of Figure 5;

Figure 14 is a half sectional view of another modification of Figure 5;

Figures 15, 16 and 17 are views of different arrangements of Figure 14;

Figure 18 is a half sectional view of a modification of Figure 5;

Figure 19 shows a modified form of Figure 1.

In Figure 1, I have provided a mechanism, the general design, construction and operation of which, including provisions for speed changes of reverse, first forward speed and control thereof, are conventional, the novelty pertaining only to the particular provisions for speed changes of second and third or high speed, transmission of power therethrough and also the manner of controlling the same. Therefore, this description will be confined to only the construction and operation of said novel mechanism, in combination with the entire transmission mechanism.

A casing 1 contains and supports in proper relation the entire transmission mechanism. A cover plate 2 supports the change speed control mechanism. A housing 3 covers the top of the mechanism and supports and houses the lower portion of a manual control member or lever 4. A shaft 5 has connection with the engine or other driving means through a clutch (not shown) or otherwise. A countershaft cluster 6 provides part of the various speed changes. The transmission main shaft 7 is connected to the means driven, and supports part of the means for selecting the various speed changes. The latter means include a second speed gear 8 freely rotatable on the main shaft 7 and provided with external gear teeth 9 meshing with the teeth 11 of the second forward speed gear 12 of the countershaft cluster 6.

The main shaft 7 is splined to provide teeth 13 and grooves 14, and the grooves 14 communicate with a circumferential groove 15. A ring 16 is internally splined to correspond with the splined portion of the shaft 7 and is positioned in the groove 15 by sliding the same along the splines of the shaft 7 until the groove 15 is reached. Housed in the shaft 7 in the plane of the groove 15 is a spring-pressed detent 17 which lies also in the plane of one of the grooves 14. After the ring 16 reaches the groove 15, said ring is rotated until the grooves are aligned with the grooves 14 in the shaft 7, whereupon the detent 17 snaps into the juxtaposed groove of the ring 16 and the latter is thus held against movement circumferentially and longitudinally of the shaft 7.

The gear 8 is rabbeted at 18 to loosely receive the ring 16, and is secured against movement axially thereof by a plate 19 suitably fastened as by bolts 20 to the gear 8, so that the ring 16 is straddled by the gear 8 and the plate 19. The teeth 9 of the gear are thus constantly in mesh with the teeth 11 on the countershaft gear 12.

The shaft 5 is journalled at 21 in the casing 1 and has a hollow portion projecting into the casing. The mainshaft 7 is journalled in the opposite end of the casing at 22 and has a reduced end 23 journalled in the shaft 5 at 24.

The hollow portion of the shaft 5 constitutes a gear 25 having teeth 26 which are constantly meshed with the teeth 27 on the countershaft gear 28.

The gears 8 and 25 have reduced portions 29 and 30, respectively, provided with external teeth or splines engaging the internal teeth or splines on clutch rings 31 and 32, and secured thereto against relative longitudinal movement by pins or keys 33. Keyed at 34 on the shaft 7 adjacent and between the respective clutch elements 31 and 32 are cone clutch members 35 and 36, which snugly receive the shaft 7 and are spaced from the clutch elements 31 and 32 by thrust bearings 37.

The main shaft 7 is provided intermediate the members 35 and 36 with a circumferential series of projections 38 which are separated from the members 35 and 36 by spacing means 39 snugly fitting about the shaft 7 and provided interiorly with notches 41 in which the pins 40, secured to and projecting beyond the shaft 7, snugly fit. Thus movement of the cone members 35 and 36 axially of the shaft 7 is prevented. The bottoms 42 of the spaces between adjacent projections 38 are straight and provide bearing surfaces for rollers 43. The outer surfaces 44 of the projections 38 are parts of the same cylindrical surface and constitute a bearing for a shell 45, the cooperating surface 46 of the latter closing the spaces between the projections 38. Each bottom surface 42 is so arranged that one end is farther from the surface 46 than the other end, so that the rollers 43 disposed in said spaces will grip the inner and outer walls of the spaces under certain circumstances to prevent relative rotation of the main shaft 7 and the shell 45 and in another position, will release the shaft 7 and shell 45 to permit relative rotation therebetween.

In order to insure proper alignment of each roller 43 so that the same will properly grip the surfaces 42 and 46, and to make each roller 43 automatically operative, each projection 38 is provided with a substantially tangential recess 47 in which a spring 48 enclosed by a plunger 49 is located. Between the plunger 49 and the roller 43 is disposed an arcuate plate 50 having a surface engaging the cylindrical surface of the roller 43 and constantly urging the same to the shallow part of the aforementioned space under the influence of the spring 48.

The surface 46 interiorly of the shell 45 is located on a central boss, the sides 51 of which cooperate with the walls of the rabbets 52 in the ring members 35 and 36 to provide a substantially annular recess. Undulating spring rings 53 and 53ª (Figures 9 and 10) fit into these recesses, the crests on one side of each of said rings engaging the shoulders 51 and those on the other side of each ring engaging the juxtaposed shoulder of the recess 52. These rings, by reason of their resilient properties, serve to automatically move the shell 45 to the neutral position shown in Figure 1 after the shell has been shifted to one side or the other and pressure on the same has been relieved.

The ring members 35 and 36 are provided with frusto-conical surfaces 54 and 55, and the shell 45 is provided with cooperating frusto-conical surfaces 56 and 57, respectively. The cone ring 36 is preferably built-up, and is provided with a cylindrical hub around which a cone ring 58 is fitted, the parts being connected by rivets 59 or the like. If desired, the other cone ring 35 may also be of the built-up type.

The cone rings 35 and 36 are provided with external teeth or splines 60 and 61 respectively and the shell 45 is likewise provided with external teeth or splines 62, all of said teeth being of substantially the same pitch diameter. The rings 31 and 32 are also provided with external teeth or splines 63. A shiftable clutch sleeve 64 surrounds the shell 45 and is provided with a central series of internal teeth 65 cooperating with the teeth 62 on the shell 45, whereby the sleeve and shell are slidably splined to each other. The sleeve 64 is further provided with two sets of internal teeth 66 and 67 straddling the teeth 65 and having pitch diameters corresponding to those of the teeth 63 of the rings 31 and 32, respectively.

The abutting ends of the various teeth are chamfered to facilitate interengagement, the teeth 61 and 65 being single chamfered at 68 and 69 respectively, and the teeth 63 and 67 being double chamfered at 70 and 71, respectively, as seen in Figures 11 and 12 (teeth 60 and the set of teeth 63 on the member 31 are omitted from these figures, but it is understood that they are chamfered in the same way that the teeth 61 and 63, appearing in these figures are chamfered, the chamfered surfaces on opposite ends of the teeth 65 being symmetrically inclined, preferably). With this construction, clashing of the abutting teeth is avoided so that the same are enabled to be brought into interengagement instantly, even though the teeth may be imperfectly aligned when brought together.

Intermediate the ends of the sleeve 64 is provided a plurality of holes in which springs 73 are received, each spring 73 being at least partially enclosed by a hollow plunger 74, and each hole being closed at its outer end at 75. Each plunger 74 yieldably engages the shell 45, whereby the shiftable sleeve 64 is yieldably held in any desired position with respect to the shell 45. The teeth 62 of the shell 45 which are engaged by the plungers 74 are cut out intermediate their ends at 76, the shoulders at the ends of the cut out portions providing cams for forcing the plungers 74 outwardly and for offering resistance to movement of the sleeve 64 on the shell 45 beyond the points where said plungers come into engagement with said shoulders.

The internal teeth 65 of the sleeve 64 are provided in a plurality of series, each series being spaced from the adjacent series as shown at 77.

The sleeve 64 is provided with an outer peripheral groove 78 in which is received a shift fork element 79, employed for shifting the sleeve 64 to the right as viewed in Figure 1 to establish second forward speed and to the left to establish third forward speed.

The countershaft cluster 6 is journalled on a spindle 80 whose ends are fixed in the casing 1, and includes gears 12 and 28 which are constantly engaged or meshed with the gears 8 and 25, respectively, and first forward speed gear 81 and reverse speed gear 82. A gear 83 slidably splined on the shaft 7 is shiftable by means of the element 84 into mesh with the gear 81 to establish first forward speed or into mesh with a reverse idler (not shown) constantly meshed with the reverse gear 82 to establish reverse speed.

The speed control mechanism supporting member 2 spans the upper part of the casing 1 and is secured to the latter by any suitable means such as screws (not shown). The member 2 is provided with a slot 85 which serves as a guide and limiting means for the shift bar or rail 86, the depending arm 84 of which, as above pointed out, cooperates with the gear 83 on the main shaft 7 to establish first forward and reverse speeds. For the purpose of properly securing the bar 86 in proper position there is provided a plate 87 which rests on the member 2 over the slot 85, said plate and the bar 86 being connected by rivets 88 passing through a guide rod 89 which slidably fits in the slot 85. The bar 86 is provided with a notch 90 for reception of the knob 91 at the lower end of the gear shift lever 4, the plate 87 being also notched at 92 to provide clearance for said lever. The lever 87 is provided with three longitudinally spaced recesses 93 for selectively receiving a spring pressed detent 94 carried in a boss 95 of the control mechanism housing 3. The spacing of the recesses 93 corresponds to the first forward, neutral and reverse speed positions of the gear 83, said detent 94 serving to yieldably hold the gear 83 selectively in each of said positions.

The supporting member 2 is provided with another slot 96 which serves as a guide and limiting means for the gear shift bar or rail 97 which carries a depending arm 79 cooperating with the shifting sleeve 64 and projecting into the groove 78 in the latter for establishing by its movements second and third forward speeds, respectively. For the purpose of securing the rail or bar 97 in proper position, there is provided a plate 98 supported by the member 2 and disposed over the slot 96 therein, the plate 98 and rail 97 being connected by rivets 99. A guide rod 100 through which the rivets 99 pass, slidably fits in the slot 96. The rail 97 and plate 98 are notched at 101 and 102, respectively, to provide a clearance for the gear shift lever.

The control mechanism supporting member or plate 2 is provided with an opening 103 of substantially H-shape through which the lower end of the gear shift lever 4 projects, and by which said lever is guided in its movements for establishing the various speeds as well as a neutral condition of the transmission. The notch 90 of the shift rail 86 registers with an intermediate portion 104 of the opening 103 when the transmission is in neutral setting. When the first speed forward or reverse speed setting is desired, the gear shift lever 4 is shifted to the right of the car to bring the lower end or knob 91 into the notch 90, whereupon a shift of the lever forwardly establishes, through the medium of the arm 84, first speed, and in the reverse direction, reverse speed.

The left branch of the opening 103 is stepped to provide two communicating recesses 105 and 106. The recess 106 is interrupted by a projection 107 which is aligned with the intermediate portion 104 of the opening 103 and requires that the lower end of the gear shift lever 4 be moved in four steps before it can be deposited in either of the ends of the recess 106, that is, from a neutral position, first laterally toward the projection 107 into the recess 105, then longitudinally toward one end of the recess 105, then again laterally into one part of the recess 106, and then again longitudinally toward the end of said part of the recess 106.

A member 108 is disposed over and secured by means of one or more of the rivets 99 to the plate 98, said member having an upstanding portion 109 which terminates upwardly in a U-shaped part 110 which is aligned or in register with the intermediate portion 104 of the opening 103 when the transmission is in neutral or in first speed or reverse speed. The U-shaped part 110 is arranged to receive the lower part of the gear shift lever 4, said lower part being rounded at its sides 111 which engage the arms of the U-shaped part 110 and permit of relative angular movement between the lever 4 and the arms of the part 110. The plate 98 is provided with a longitudinal series of five recesses 112 for selectively receiving a spring pressed detent (not shown) identical with that designated 94 in Figure 1, whereby the depending arm 79 of the shift rail 97 will be yieldably held in any position into which it is shifted by the gear shift lever 4.

The lever 4 is connected to the housing 3 by a ball and socket joint at 113 and is held in position by a spring 114, the pin and slot connection at 115 serving to prevent turning of the lever 4 about its own axis.

The transmission mechanism shown in Figure 1 is in neutral position, and when the shaft 5 is rotated by the engine (not shown), the countershaft cluster 6 is caused to rotate by reason of the meshing of the gears 25 and 28, and the gear 12 of the cluster 6 causes rotation of the second speed gear 8 on the main shaft 7, without corresponding rotation of the latter.

Third speed is established as follows:

The gear shift lever 4 is manually moved so that its lower end is shifted in the direction indicated by the arrow at A in Figure 3 until the portion 111 is deposited in the U-shaped part 110 and the knob 91 in the recess 105, such movement being limited by the projection 107 on the control mechanism supporting member 2. The portion 111 of the lever 4 is then moved forward in the direction of the arrow at B in Figure 1, whereupon motion in the same direction is transmitted through the arm 79 to the sleeve 64. The sleeve 64 during this movement slides upon the shell 45, movement of which is yieldably temporarily prevented by the spring 53a, and is coupled with the shaft 5 by means of the internal teeth 67 of the sleeve 64 and the external teeth 63 of the ring 32 carried by the shaft 5. The abutting ends of these teeth are chamfered at 70 and 71 as above explained to provide for unhesitating engagement of said teeth. The parts are now arranged as shown in Figure 6, and the drive from the shaft 5 to the shaft 7 is direct from the gear 25 to the sleeve 64 to the shell 45 to the rollers 43 to the shaft 7.

The rollers 43 cooperating with the adjacent parts of the main shaft 7 and shell 45 provide a one-way or over-running clutch by means of which power is transmitted, when the parts are arranged as just described, from the engine through the shaft 5 to the main shaft 7 and ultimately to the driving wheels, but which permits the main shaft 7 to overrun the shaft 5 when the automobile or other vehicle embodying this construction moves by virtue of its own momentum. Thus, after the vehicle has been put into motion and during the occasions thereafter when the engine is allowed to cease driving, the vehicle is "free" to "wheel" or run at a speed correspondingly equal to or greater than that of the engine, without transmission of corresponding motion to the engine.

When the vehicle is free wheeling, the shell 45 exerts a "drag" upon the rollers 43, tending to move the latter down the inclined bottoms 42 of the spaces between the projections 38 of the main shaft 7 to a point where the friction of the rollers against the shell 45, due to centrifugal force acting upon the rollers 43, would tend to spin the rollers. To obviate this tendency, the plates 50, spring-pressed into engagement with the rollers 43, are provided. The plates 50 force the rollers 43 into proper frictional engagement with the surfaces 42 and 46.

Double direction torsional power transmission or "positive drive" in third or high speed is obtained as follows:

The gear shift lever 4 is manipulated so that its lower end moves from its above-described position adjacent the forward end of the recess 106 in the direction of the arrow A in Figure 3 until it is disposed in the forward portion of the recess 106, and is then shifted to the forward end of the recess 106. During this movement, the lower end of the gear shift lever 4 is disposed in the U-shaped part 110, and upon the last-named movement, which is in the direction of the arrow B as seen in Figure 1, the shift rail 97 and the arm 79 depending therefrom cause a forward movement of the sleeve 64 from the position shown in Figure 6 to that shown in Figure 7 and subsequently into that of Figure 8. It will be noted that when the parts are arranged in neutral as shown in Figures 1 and 5, or in the free wheeling third speed position as shown in Figure 6, the frusto-conical clutch surfaces 55 and 57 are out of engagement. When, however, the last-named movement in the direction of the arrow B is initiated, so that the parts are arranged as shown in Figure 7, these frusto-conical surfaces are brought into frictional interengagement by reason of the engagement of the plunger 74 with the forward shoulder at the forward end of the slot portion 76 of the shell tooth 62. The spring 73 by which the plunger 74 is urged radially inward is of sufficient strength to hold the said frusto-conical surfaces in tight engagement, thus causing the members 36 and 45 to rotate at the same speed or become synchronized. It will be observed from Figure 7 that when this synchronization takes place, the forward ends of the teeth 65 are in close proximity to the adjacent ends of the teeth 61 on the clutch member 36. Upon continuation of the forward movement of the lower end of the gear shift lever 4 as above mentioned, the teeth 65 and 61 are brought into interengagement, which is facilitated in the event of disalignment of said teeth by reason of the fact that said teeth are chamfered respectively at 68 and 69 at their abutting ends as shown in Figures 11 and 12, so that when the lower end of the gear shift lever 4 reaches the forward limit of its movement, the parts are arranged as shown in Figure 8. The shafts 5 and 7 are now locked together so that a positive drive is established therebetween in third speed, that is, neither of these shafts can be rotated, regardless of direction, without simultaneously rotating the other shaft. Thus, in the event the vehicle tends to move by virtue of its momentum, the engine will be coupled to the main shaft 7 and will serve as a brake. This drive is established through the clutch ring 32 which is splined on the shaft 5, the sleeve 64 which is tooth-clutched with the ring 32, the cone clutch ring 36, which is tooth-clutched to the sleeve 64, and the forward key 34.

During the movement of the shell 45 forward by the spring-pressed plunger 74, the spring 53a is compressed, as a comparison of Figures 6 and 7 will serve to show. Continued forward movement of the shell 45 beyond the position shown in Figure 7 is resisted by the cone clutch ring 36, so that as the sleeve 64 is moved further in a forward direction by the lower end of the gear shift lever 4, the spring pressed plunger 74 is caused to ride outwardly by the forward end of the flattened portion 76 of the tooth 62 on the shell 45, until it reaches the high part of the tooth 62 as shown in Figure 7, whereupon the force exerted by the spring 53a overcomes the frictional resistance of the spring pressed plunger 74 and shifts the shell 45 to its neutral position as shown in Figure 8. This release or separation of the shell 45 and ring 36 makes possible the coupling together or clutching together of the teeth 65 and 61 of the parts 64 and 36, respectively, the member 64 rotating slightly in the direction indicated by the arrow at D in Figure 12 in the event these teeth are not perfectly aligned when brought together.

From the foregoing, it will be readily understood how the gear shift lever 4 is manipulated to establish both the second speed free wheeling and the second speed double direction or "positive" drive. It is necessary merely to make the same movements as previously described but in the opposite direction, that is, so that the lower end of the gear shift lever will be moved from a neutral position, for example, first to the left until stopped by the projection 107 and then to the rear until stopped by the rear end of the recess 105, to establish free wheeling in second speed as follows: from shaft 5 through gears 25 and 28 to countershaft 6, through gears 12 and 8 to ring 31, through teeth 63 and 66 to shifting sleeve 64, through teeth 65 and 62 to shell 45, and through the overrunning clutch including the rollers 43 to the main shaft 7. By a further shift of the lower end of the gear shift lever 4 to the left of the car and then to the rear end of the recess 106, the positive or double direction drive between the shafts 5 and 7 is established as follows: from shaft 5 through the gears 25, 28, 12 and 8, clutch teeth 63 and 66, clutch teeth 65 and 60, and the key 34 in connection with the cone clutch ring 35. The cooperation between the frusto-conical surfaces 54 and 56 on the respective members 35 and 45, the action of the spring 53, and the cooperation between the chamfered surfaces of the teeth 63 with the teeth 66 and the teeth 60 with teeth 65 being identical with that above explained in connection with the establishment of third speed.

It will be noted that the teeth 66 and 67 are of sufficient length to maintain their engagement with the teeth 63 of the rings 31 and 32 for the second and third speeds regardless whether the teeth 65 of the sleeve 64 are in engagement with the teeth 60 of the cone ring 35 or the teeth 61 of the clutch cone ring 36, respectively.

In Figure 13 is shown a modified form of the invention insofar as the synchronizing feature is concerned. In this form, instead of the frusto-conical surfaces and spring rings being provided in connection with the shell of the overrunning clutch, they are associated with the clutch shaft and the second speed gear carried by the main shaft. In this construction, the engine clutch shaft 116 carries clutch teeth or splines 117 for cooperation with the clutch teeth or splines 118 of the shifting sleeve 119 for establishing a free wheeling drive between the engine clutch shaft 116 and the transmission main shaft 120 through the overrunning clutch including the rollers 121, shell 122 and slidably interengaged teeth or splines 123 and 124 of the parts 122 and 119, respectively. The second forward speed gear 125, is, as with the previously described form of the invention, freely rotatable on the main shaft 120 and carries teeth or splines 126 for cooperating with the internal teeth or splines 127 of the sleeve 119 to establish, by means of the overrunning clutch structure just described, a free wheeling drive between the shafts 116 and 120 in second speed.

Straddling the overrunning clutch structure are cone clutch rings 128 and 129 by and between which and the overrunning clutch shell 122 spacers 130 are carried, the rings 128 and 129 at their opposite ends having frusto-conical surfaces 131 and 132, respectively, for cooperating with the internal frusto-conical surfaces 133 and 134. Spring rings 135 and 136 are provided for releasing the frusto-conical surfaces after the pressure by which they are held in contact is removed. The rings 128 and 129 are provided with teeth or splines 137 and 138, respectively, for cooperation with the teeth 124 of the sleeve 119 to establish respectively double direction or "positive" drive between the shafts 116 and 120 in second or third forward speed. The sleeve 119 is provided with a plurality of circumferentially spaced spring pressed plungers 139 which engage certain of the teeth 123 of the overrunning clutch shell 122 and thereby frictionally hold these parts against accidental relative movement. The teeth 123 which are engaged by the plungers 139 are flattened at 140 intermediate their ends, the ends of the flattened portion 140 providing shoulders 141 and 142 for cooperation with the plungers 139. The rings 128 and 129 are splined at 143 to the main shaft 120.

It will be understood that to establish the double direction or positive drive between the shafts 116 and 120, it is necessary, for example in connection with third speed, merely to shift the sleeve 119 to cause the teeth 117 and 118 to become interengaged by occupying the relative positions corresponding to those shown in Figure 6 in the previously described form of the invention, at which time the plungers 139 are engaged with or about to engage the shoulders 142 of the teeth 123, then to further shift the sleeve forward to a position corresponding with that occupied by the sleeve 64 in Figure 7, whereupon the forward pressure exerted by the plungers 139 on the shoulders 142 is communicated to the cone clutch ring 129 through the spacer 130, the spring 136 being compressed and the surfaces 132 and 134 being brought into frictional contact, whereby the ring 129, and consequently the shaft 120, is synchronized with the shaft 116 and the overrunning clutch shell 122. At this moment, the forward ends of the teeth 124 are in close proximity to the rear end of the teeth 138 on the ring 129, and the plunger 139, due to the resistance offered by the shaft 116 to further forward movement of the shell 122 by said plunger, rides up the shoulder 142 and to rest on the high part of the tooth 123, whereupon the spring 136 overcomes the friction of the plunger 139 on the tooth 123 and releases the surface 132 from the surface 134. At this point, the forward movement of the sleeve 119 is continued, and the teeth 124 caused to engage the teeth 138. In the event there is a disalignment of the teeth 124 and 138 as they come together, a slight relative rotary movement will take place between these sets of teeth until proper alignment occurs whereupon the teeth will be interengaged and the parts be positioned in a relation corresponding to that of the parts in Figure 8. This relative rotary movement of the parts is made possible by reason of the fact that the abutting ends of the various teeth 117, 118, 127, 126, 124, 137 and 138 are chamfered in the same way in which the corresponding tooth ends of the previously described form of the invention as shown in Figures 11 and 12 are chamfered.

In the form of the invention appearing in Figures 14, 15, 16 and 17, provision is made for synchronizing prior to engagement of the teeth by which the free wheeling drive in second or third speed is provided, as well as prior to the engagement of the teeth by which the double direction or positive drive in either of these speeds is established. In this form of the invention, the shifting sleeve 144 is provided with the usual series of spring-pressed plungers 145, and the teeth 146 of the overrunning roller clutch shell 147 cooperating with the plungers 145 are each provided with three notches 148, 149 and 150. When the transmission mechanism is set for neither second or third speed, the plungers 145 are disposed in the central notches 149. Upon shift of the sleeve 144 forwardly for the purpose of establishing either or both of the free wheeling and double direction or positive drives in third speed, the sleeve 144 is given an initial forward movement to bring it from the position it occupies in Figure 14 to that it occupies in Figure 15. This movement effects, by reason of the transmission of force from the plunger 145 to the forward wall of the notch 149, a frictional engagement of the cooperating frusto-conical surfaces of the roller clutch shell 147 and ring member 151 at 152, the releasing spring 153 between these parts being compressed as shown, and also frictional engagement between the frusto-conical surfaces of the parts 124 and 151 at 154, the spring 155 between these parts being also compressed as shown in Figure 15. The part 151 is shiftable by reason of its spline connection with the main shaft 156 at 157. The result is that the shell 147 is frictionally coupled to the shaft 124 by means of the part 151 so that the sleeve 144 is synchronized with the shaft 124. The internal teeth 158 of the sleeve 144 are now in close proximity to the teeth 159 of the shaft 124, and the plunger 145 is at the crest of the portion of the tooth 146 intermediate the notches 149 and 150, whereupon, as the sleeve 144 is shifted further forwardly, the teeth 158 and 159 are brought into interengagement as shown in Figure 16, the plunger 145 thereupon dropping into the forward notch 150. It will be noted that the teeth 159 are shortened rearwardly to allow the various parts to come into frictional engagement before said teeth are engaged with the teeth 158. When the parts are positioned as shown in Figure 15, with synchronization complete, the springs 153 and 155 are free to expand since the resistance offered by the plunger 145 is considerably reduced, and the shell 147 and ring 151 are moved by said springs to the rear and out of engagement with each other until the parts 124, 151, and 147 occupy the same relative positions in Figure 16 which they occupied initially as shown in Figure 14. The mechanism is now arranged to free wheel, the shafts 124 and 156 being connected through the overrunning roller clutch 160.

Upon continued forward movement of the sleeve 144, pressure is transmitted in a forward direction to the shell 147 and part 151 by reason of the engagement of the plunger 145 with the forward wall of the forward notch 150 so that the parts 124, 147 and 151 are brought in the relative positions shown in Figure 15, the springs 153 and 155 being again compressed. The said parts are again thus brought into synchronism and the internal teeth 161 of the sleeve 144 and the external teeth 162 of the part 151 are in close proximity to one another. At this point, the plunger 145 is positioned forwardly beyond the notch 150, whereupon the springs 153 and 155 are again free to release the frictionally engaging parts, the continued forward movement of the sleeve 144 bringing the teeth 161 and 162 into engagement as shown in Figure 17. With the parts thus arranged, the overrunning clutch 160 is locked out, the shafts 124 and 156 being coupled through the ring 151 and the sleeve 144.

Free wheeling and double direction or positive drives in second speed are obtained in response to reverse movement of the sleeve 144 from its neutral position shown in Figure 14 in exactly the same manner in which the corresponding connections for third speeds are obtained, the connection between the shafts 124 and 156 for second speed being obtained, of course, through the countershaft 6 as will be understood upon inspection of Figure 1.

As in the previously described forms of the invention, the abutting ends of the various interengaging parts are preferably chamfered so that in the event the coengaging teeth are disaligned just prior to engagement, they may be brought unhesitatingly into alignment and interengaged.

It will be noted that the rear wall of the forward notch 150 and the forward wall of the rear notch 148 are less abrupt than the other walls of the various recesses. This construction permits the plunger 145 to ride up said less abrupt walls during the return movement of the sleeve 144, without corresponding movement of the roller clutch shell 147.

A further modification of the invention is illustrated in Figure 18. This form, which is similar to the first above described form in principle, comprises a shaft 163 which carries outer peripheral teeth 164 and is provided with an internal frusto-conical surface 165 for cooperation with an external frusto-conical surface 166 on a ring 167 which is splined at 168 to the transmission main shaft 169. Instead of the main shaft 169 being provided with integral projections providing inclined surfaces upon which the rollers of the overrunning roller clutch ride, said shaft has a plurality of such projections, designated 170, slidably splined thereon at 171, and while a single set of rollers may be provided, it is preferred that three sets of rollers 172 be provided. The shell 173 of the overrunning clutch of this construction is provided with external teeth 174 of a construction substantially identical with that of the teeth 62 of the shell 45 in the form of the invention appearing in Figure 1, the teeth 174 being centrally reduced at 175 to provide end shoulders 176 and 177 for cooperation with the spring pressed detents of plungers 178 carried by the shiftable sleeve 179 as in Figure 4.

A second ring 180 corresponding with the ring 167 is also slidably splined at 181 on the shaft 169, and the rings 167 and 180 are connected to each other and to the projections 170 by means of pins 182 passing therethrough. The rings 167 and 180 straddle the parts of the overrunning clutch so that the latter is movable as a unit axially of the main shaft 169.

The ring 180 is provided with external teeth 183 and with an internal frusto-conical friction surface 184 for co-operating with the external frusto-conical surface 185 on the second speed gear 186, the latter being confined against longitudinal movement but freely rotatably mounted on the main shaft 169. The second speed gear 186 is also provided with external teeth or splines 187 which are engageable with the internal teeth or splines 188 on the shiftable sleeve 179 to establish free wheeling drive in second speed between the shafts 163 and 169. The sleeve 179 is slidably splined on the overrunning roller clutch shell 173 by reason of the interengagement of the teeth 174 of the latter with the internal teeth or splines 189 of the sleeve 179. Release springs 190 and 191 cooperate respectively with the pair of frusto-conical surfaces 165, 166, and the pair of frusto-conical surfaces 184, 185, to thrust the surfaces of each pair apart upon release of the pressure tending to cause said surfaces to engage.

Employing the control means described hereinabove, the sleeve 179 is first shifted forwardly to bring its teeth 189 into engagemtnt with the teeth 174 of the shaft 163, whereby the drive between the shafts 163 and 169 is established through the overrunning clutch above described. At this point, the detent or plunger 178 is in engagement with or about to engage the forward shoulder 177 of the tooth 174 of the overrunning clutch shell 173. The gear shift lever 4 is thereupon manipulated to impart a further forward movement to the sleeve 179, the force being communicated to the shell 173 by reason of the engagement of the detent 178 with the shoulder 177, and the ring 167 engages and compresses the spring 190 against the shaft 163 and the surfaces 165 and 166 are brought into frictional engagement, thereby synchronizing the sleeve 179, which is engaged with the shaft 163, with the ring 180. At this point, the teeth 188 are in close proximity to the teeth 183, and as the detent or plunger 178 rides up the shoulder 177 to the high part of the tooth 174 because of the resistance to further forward movement of the shell 173, the spring 190 expands and moves the teeth 183 toward the teeth 188 at the same time that the latter teeth are being moved toward the teeth 183 by virtue of the continued forward movement of the sleeve 179 by the gear shift lever 4, as a result of which the teeth 183 and 188 are brought into interengagement. The drive between the shafts 163 and 169 is now positive, that is, double directional, since it is entirely independent of the overrunning roller clutch, said drive being established from the shaft 163 to the sleeve 179 to the ring 180 and thence to the main shaft 169.

By reverse movements of the sleeve 179 from neutral in response to manipulation of the gear shift lever, the teeth 188 are first brought into engagement with the teeth 187 of the second speed gear 186 to thereby establish an overrunning or free wheeling drive from the shaft 163 through the countershaft 6 to the second speed gear 186 to the sleeve 179 through the overrunning clutch rollers 172 to the main shaft 169, and as the rearward movement of the sleeve 179 is continued, the frusto-conical friction surfaces 184 and 185 are brought together so that the ring 180 is synchronized with the sleeve 179. As said movement of the sleeve 179 is completed, the teeth 189 thereof engage the teeth 183 of the ring 180, said surfaces 184 and 185 being at the same time separated by reason of the expansion of the spring ring 191.

With the construction just described, the abutting ends of the various interengaging teeth are preferably chamfered as is true of the above constructions.

In Figure 19 is illustrated a modified form of the construction appearing in Figure 1, the provision for free wheeling being such as to allow for this character of drive in all forward speeds, and the free wheeling instrumentalities being provided in a unit entirely separate from the transmission mechanism by which the various speeds are established in connection with the gear shift mechanism. Also in the form of the invention appearing in Figure 19, the transmission mechanism has an individual synchronizing unit separate and distinct from the synchronizing unit employed in connection with the free wheeling unit. In the form of the invention appearing in Figure 19, it will be found that certain details of the mechanism are identical with or at least similar to those heretofore described, and for that reason, the construction appearing in this figure will be readily understood without requiring a detailed description thereof.

In this form of the invention, it will be noted that a shift of the sleeve 212 forwardly will at first be transmitted through the spring-pressed plunger 213 carried by the annulus 214, which is splined to the transmission main shaft 215, and through the annulus 214, which carries a ring 216 having an interior frusto-conical surface. This surface is brought into engagement with the complemental surface 217 adjacent the clutch teeth 218 carried by the engine clutch shaft 219, thus bringing the sleeve 212 into synchronism with the engine clutch shaft 219. As the sleeve 212 continues its forward movement, the resistance offered by the frusto-conical surface 217 results in the depression of the spring pressed plunger 213 by the sleeve 212, thereby arresting the movement of the ring or annulus 214, the internal clutch teeth 220 of the sleeve 212 being thereupon brought into clutching engagement with the clutch teeth 218 on the engine clutch shaft 219, thereby establishing through the annulus 214, on which the sleeve 212 is always splined, a direct conventional drive from the engine shaft 219 to the transmission main shaft 215.

Second speed is established in like manner in response to a rearward movement of the sleeve 212 in response to a corresponding manipulation of the gear shift lever 221, spring-pressed balls 222 being provided to cooperate with notches 223 in the shift rails 224 to yieldably hold the gear shift lever, shift rails and the members controlled thereby in the desired positions. The instrumentalities employed in establishing second speed in this form of the invention are substantially identical with those just described and need not be further elaborated upon, the drive then taking place by virtue of the clutch shaft spur gear 225, the countershaft cluster 226, the constant mesh second speed gear 227, the sleeve 212, the ring 214, and the transmission main shaft 215. The shifting fork 228 is connected to a shift rail 224 in any desired manner to respond to the movements of the gear shift lever 221 in establishing second and third speeds.

First speed and reverse speed drives are established in a manner heretofore described in connection with another form of the invention, the fork 229 being carried by the other shift rail 224 and operative upon the slidably splined gear 230, which cooperates respectively with the low speed gear 231 of the countershaft cluster 226 and through a reverse idler (not shown) with the reverse gear 232 of the countershaft cluster.

The casing or housing 233 contains the instrumentalities just described, a top housing member 234 serving to carry the spring-pressed balls or plungers 222 and to enclose the lower end 235 of the gear shift lever 221 and provide a universal socket 226 for said lever.

The free wheeling mechanism employed in conjunction with the construction just described is in the form of an individual unit and is carried in a casing 237 appropriately secured to the casing 233 by suitable means such as the bolts 238. The transmission main shaft has its rear end projecting into the casing 237, said end being reduced and splined, and being journalled in the casing 237 at 239. Splined on the rear end of the main shaft 215 is a sleeve 240 which is slidable and is provided with external teeth or splines 241 slidably interlocked with corresponding internal teeth or splines on the overrunning clutch cam 242. The cam ring 242 carries one or more spring pressed plungers 243 which are normally received in notches 244 in the teeth or splines 241 of the sleeve 240, thereby yieldably holding the cam ring 242 against axial movement relative to the sleeve 240. A series of rollers 245 is preferably equally spaced circumferentially about the cam ring 242, the adjacent surfaces of the latter being so cut as to form with the interior surface 246 of the overrunning clutch shell 247 a series of pockets having converging walls. This construction is similar to that of the overrunning clutches heretofore described, and it will be apparent from the foregoing that by means of this construction movement of the shell 247 in only one direction relative to the cam ring 242 will be possible.

The overrunning clutch shell 247 is provided with a circumferential groove 248 which receives a shifting fork or similar part 249 depending from the auxiliary shift lever 250, whereby the manipulation of the latter will result in corresponding axial movements of the overrunning clutch shell 247. The auxiliary lever 250 is supported for forward and reverse movements only by means of a pivotal connection at 251 with the top plate 252 of the casing 237.

The tail shaft 253 extends axially rearwardly of the transmission main shaft 215, in axial alignment therewith, and is journalled in bearings 254 in a housing or casing 255 which is bolted at 256 or otherwise suitably secured to the free wheeling unit casing 237 at the rear end thereof. The rear end of the tail shaft 253 is splined and carries one part 257 of a universal joint coupling (not shown) by which the tail shaft 253 is connected to the propeller shaft of the vehicle. The forward end 253a of the tail shaft 253 is hollowed out to receive the adjacent end of the sleeve 240, said parts being provided with cooperable frusto-conical surfaces 258 and 259, respectively. The forward end of the tail shaft 253 is further provided with a circumferential series of teeth or splines 260 which are always slidably interengaged with a circumferential series of corresponding internal teeth 261 on the overrunning clutch shell 247.

The cam ring 242 is provided with a peripheral series of clutch teeth 262 for cooperation with a like set of internal teeth 263 on the forward end 253a of the tail shaft 253.

With the parts arranged as shown in Figure 19, it will be observed that upon manipulation of the gear shift lever 221 to establish any forward speed in the transmission, an overrunning one-way drive is established between the transmission main shaft 215 and the tail shaft 253 through the overrunning clutch instrumentalities embodying among other things the cam ring 242, the rollers 245 and the shell 247. The arrangement of the cam surfaces on the ring 242 is such that during the movement of the transmission main shaft 215 in a direction to propel the vehicle forward, torque is transmitted from the cam ring 242 through the rollers 245 to the shell 247 and thence to the tail shaft 253, but when the vehicle is being propelled by reason of its momentum, no torque is transmitted from the overrunning clutch shell 247 through the rollers 245 to the cam ring 242, the rollers 245 under such circumstances running idle in the wide or deep ends of their respective pockets.

Should it be desired that the free wheeling device be locked out, so that the vehicle will proceed in conventional drive for all speeds, it is necessary merely to shift the auxiliary lever 250, which projects upwardly through the floorboard of the car within easy reach of the driver, forwardly as indicated by the arrow F in Figure 19, which movement will result in a rearward movement of the fork 249 and its associated overrunning clutch shell 247, thereby bringing the frusto-conical surfaces 258 and 259 into frictional engagement and initially synchronizing the teeth 262 and 263 prior to their interengagement. As the rearward movement of the shell 247, together with the rollers 245 and cam ring 242 continues, the continued rearward motion of the sleeve 240 is resisted by the forward end 253a of the tail shaft 253, and as a result the forward wall of each notch 244 cams the corresponding spring-pressed ball 243 out of said notch, thereby allowing the shell 247, rollers 245 and cam ring 242 to continue in their rearward movement with the result that the teeth 262 and 263 are brought into interengagement, said engagement being facilitated by reason of the chamfered meeting ends of said teeth as indicated respectively at 264 and 265. The drive from the transmission main shaft 215 to the tail shaft 253 is then such as to lock out the overrunning instrumentalities, and is taken through the sleeve 240, the cam ring 242 and the teeth 262 and 263.

Provision is made in the form of the invention appearing in Figure 19 to automatically render the free wheeling instrumentalities inoperative, that is, to lock out the same, upon the establishment of reverse drive of the transmission. To this end, a pin 266 is slidably received in the casings 233 and 237 at the juncture thereof, the forward end 267 of said pin being engageable with the low and reverse speed shifting fork 229 of the transmission and the rear end 268 of the pin being engageable with the shoulder 269 of the overrunning clutch shell 247. When the gear shift lever 221 is manipulated so that the low and reverse slidable gear 230 is shifted rearwardly into mesh with the reverse idler (not shown), the shifting fork 229 engages the forward end 267 of the pin 266 and forces the same rearwardly, causing the rear end 268 of the pin to engage the forward shoulder 269 of the shell 247 and move the same rearwardly. As a result of this rearward movement of the shell 247, the teeth 262 and 263 are first synchronized as above explained and then brought into interengagement, thereby locking out the overrunning instrumentalities so that the vehicle can be properly driven in reverse speed. The overrunning instrumentalities remain locked out under these circumstances until the auxiliary lever 250 is manually moved rearwardly to thereby shift the shell 247 forwardly and re-establish the free wheeling relation, this of course being impossible until after the gear 230 is shifted out of mesh with the reverse idler.

The various clutch teeth employed in the transmission and free wheeling units just described, and which are not always in interengagement, are preferably chamfered at their meeting ends in order that their interengagement may be facilitated, as explained above in connection with other forms of the invention.

I claim as my invention:

1. Power transmission mechanism comprising a drive member, a driven member, means associated with said members for establishing an overrunning drive therebetween, said means comprising interengageable teeth, means including interengageable teeth for establishing a two-way drive between said members, instrumentalities for synchronizing the teeth of each of said means immediately prior to interengagement, and means for releasing said synchronizing instrumentalities upon each of said interengagements.

2. Power transmission mechanism comprising drive and driven members having teeth, a one-way overrunning part associated with the driven member and provided with teeth disposed between the aforesaid teeth on the drive and driven members, a sleeve slidably splined on the overrunning part and having teeth engageable with the teeth of the drive member to establish a one-way drive between said members, said sleeve having teeth engageable with those of the driven member, and means for synchronizing the last-named teeth to facilitate their interengagement to establish a two-way drive between said members.

3. Power transmission mechanism comprising drive and driven members, means establishing a one-way drive between said members, instrumentalities for driving said drive member in forward and reverse directions, a member slidably splined on the drive member, said driven and slidable members having teeth interengageable to establish a two-way drive between the drive and driven members, a shifting member cooperating with said slidable member for controlling the same, said instrumentalities including a part movable toward said shifting member during the establishment of reverse drive of said drive member, and arranged to engage and shift the shifting member to cause interengagement of said teeth and thereby automatically establish a two-way drive between the drive and driven members so that the driven member can be driven by the drive member when the latter is rotating in a reverse direction.

4. Power transmitting mechanism comprising relatively movable drive and driven members, clutch means associated with said members and engageable to synchronize said members, one of said members having teeth, a part rotatable with and translatable relative to the other member and having teeth engageable with the aforesaid teeth without clashing upon engagement of said clutch means to establish a drive connection between said members, means for translating said part toward said one member, means for causing the other member to translate with said part, the last mentioned means being yieldable upon engagement of said clutch means to enable the teeth of said part to continue into engagement with the teeth of said one member, and means for releasing said clutch means upon further movement of said parts.

5. Power transmitting mechanism comprising relatively movable drive and driven members, clutch means associated with said members and engageable to synchronize said members, one of said members having teeth, a part rotatable with and translatable relative to the other member and having teeth engageable with the aforesaid teeth without clashing upon engagement of said clutch means to establish a drive connection between said members, means for translating said part toward said one member, means for causing the other member to translate with said part, the last mentioned means being yieldable upon engagement of said clutch means to enable the teeth of said part to continue into engagement with the teeth of said one member, and means constructed and arranged for automatically releasing said clutch means upon further movement of said parts.

6. Power transmitting mechanism comprising first and second drive members and an intermediate driven element, clutch means associated with said members and element and engageable to synchronize selectively either member with said element, said members having teeth, a part rotatable with and translatable relative to said element and having teeth engageable with the aforesaid teeth without clashing upon engagement of either clutch means to establish a drive connection selectively between either member and said element, means for translating said part toward either member, means for causing said element to translate with said part, the last mentioned means being yieldable upon engagement of said clutch means to enable the teeth of said part to continue into engagement with the teeth of either member, and means for returning said element to a position of neutrality relative to said members when either drive connection is effected.

7. Power transmission mechanism including driving and driven members, shiftable means for establishing an overrunning drive between said members, tooth means associated with said members and operable by a further shift in the same direction for establishing a two-way drive between said members, means for synchronizing said tooth means immediately prior to their interengagement, and means for releasing the synchronizing means prior to engagement of said tooth means.

8. Power transmitting mechanism comprising relatively movable drive and driven members, clutch means associated with said members and engageable to synchronize said members, one of said members having teeth, a part rotatable with and translatable relative to the other member and having teeth engageable with the aforesaid teeth without clashing upon engagement of said clutch means to establish a drive connection between said members, means for translating said part toward said one member, means for causing the other member to translate with said part, the last mentioned means being yieldable upon engagement of said clutch means to enable the teeth of said part to continue into engagement with the teeth of said one member, and positive means for releasing said clutch means upon further movement of said parts.

9. Power transmitting mechanism comprising relatively movable drive and driven members, clutch means associated with said members and engageable to synchronize said members, one of said members having teeth, a part rotatable with and translatable relative to the other member and having teeth engageable with the aforesaid teeth without clashing upon engagement of said clutch means to establish a drive connection between said members, means for translating said part toward said one member, means for causing the other member to translate with said part, the last mentioned means being yieldable upon engagement of said clutch means to enable the teeth of said part to continue into engagement with the teeth of said one member, and positive means constructed and arranged for automatically releasing said clutch means upon further movement of said parts.

10. Power transmitting mechanism comprising first and second drive members and an intermediate driven element, clutch means associated with said members and element and engageable to synchronize selectively either member with said element, said members having teeth, a part rotatable with and translatable relative to said element and having teeth engageable with the aforesaid teeth without clashing upon engagement of either clutch means to establish a drive connection selectively between either member and said element, means for translating said part toward either member, means for causing said element to translate with said part, the last mentioned means being yieldable upon engagement of said clutch means to enable the teeth of said part to continue into engagement with the teeth of either member, and positive means for returning said element to a position of neutrality relative to said members when either drive connection is effected.

11. Clutch structure comprising a pair of members having aligned teeth, a third member having teeth cooperable with the teeth of said pair of members for establishing a direct drive between said members, the teeth of said third member being disengageable from the teeth of at least one of said pair of members, means for synchronizing said disengageable teeth prior to the engagement thereof, and positive means for releasing said synchronizing means prior to engagement of said teeth.

12. Clutch structure comprising a pair of members, means associated with said members for establishing a one-way driving connection therebetween and including disengageable teeth, instrumentalities for synchronizing the teeth of said means immediately prior to engagement thereof, and means for rendering said synchronizing instrumentalities inoperative prior to engagement of said teeth.

13. Clutch structure comprising a pair of rotatable members having radial projections, a third member having radial projections cooperable with the projections of said pair of members for coupling the same for rotation together, one of said members being relatively movable axially with respect to the other two of said members, a friction clutch operatively disposed between two of said members and comprising a pair of frustoconical complementary surfaces, one of said surfaces being carried by a movable one of said members, means operatively associated with one of said members and operable for operating said friction clutch upon relative axial movement of said members, means for relatively moving said members for operating said friction clutch during the initial relative movement and for coupling said first mentioned members together upon further relative axial movement, and spring means operable for separating said surfaces of said friction clutch prior to the coupling of said first mentioned members.

14. In a power transmission, driving and driven shafts aligned with each other, gears drivingly connected to said shafts in constant mesh with gears on a countershaft parallel to said driving and driven shafts, synchromesh means and positive clutch means between the gears on said driving and driven shafts and component synchromesh means and positive clutch means on a shiftable unit between said gears, and a one-way clutch between said synchromesh means and said driven shaft, said one-way clutch allowing the action of said synchromesh means upon a shift of said shiftable unit.

15. In a power transmission, driving and driven shafts aligned with each other, gears drivingly connected to said shafts in constant mesh with gears on a countershaft parallel to said two shafts, synchromesh means and positive clutch means between the gears on said driving and driven shafts and component synchromesh means and positive clutch means on a shiftable unit between said gears, a one-way clutch between said synchromesh means and said driven shaft, said one-way clutch allowing the action of said synchromesh means upon a shift of said shiftable unit irrespective of whether the driving shaft is rotating ahead of or behind the driven shaft.

16. In a power transmission, a plurality of aligned shafts including driving and driven shafts, synchromesh and positive clutch means drivingly associated with said driving shaft, component synchromesh and positive clutch means shiftable into synchronizing and positive clutching engagement respectively with said first mentioned synchromesh and positive clutch means, and a one-way clutch between said shiftable synchromesh means and said driven shaft, adapted to allow the action of said synchromesh means upon a shift of said shiftable unit.

CARL F. RAUEN.